R. KRONENBERG.
AUTOCAR WHEEL.
APPLICATION FILED OCT. 1, 1909.
974,081.
Patented Oct. 25, 1910.
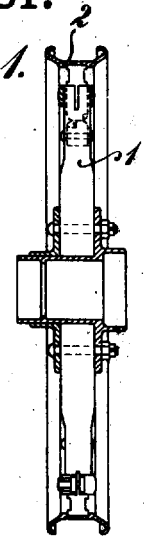
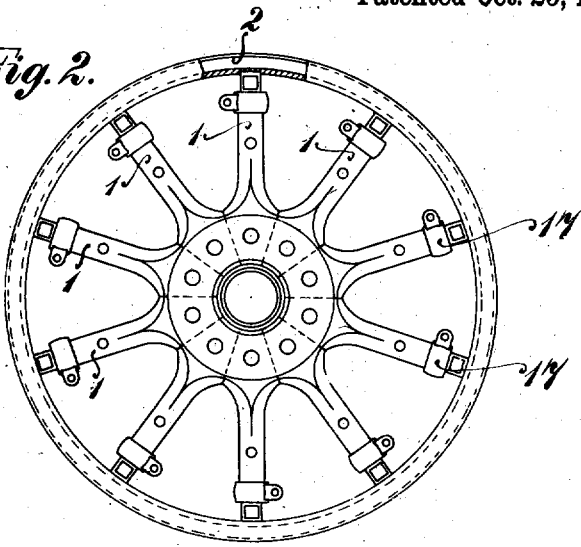
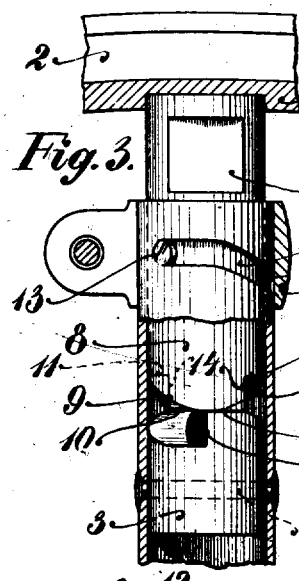
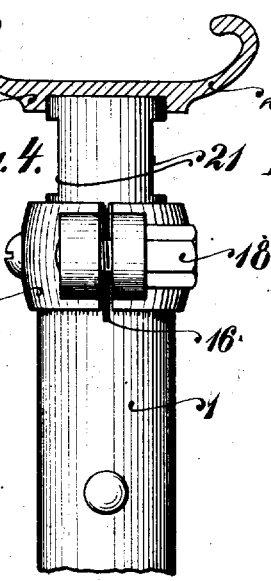
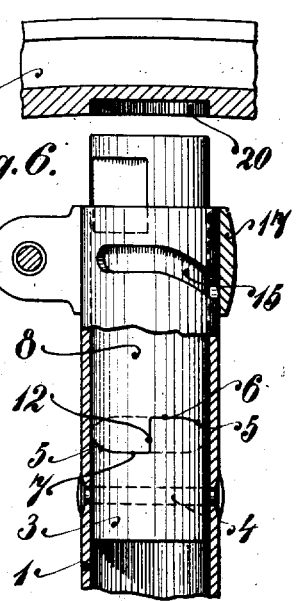
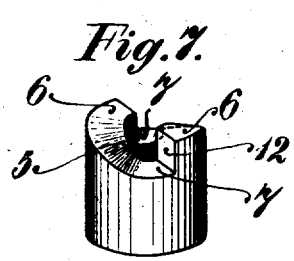
Witnesses:
L. E. Barkley
A. M. Lerch
Inventor
Rudolf Kronenberg.
per
Frank S. Appleman
Attorney.

UNITED STATES PATENT OFFICE.

RUDOLF KRONENBERG, OF OHLIGS, GERMANY.

AUTOCAR-WHEEL.

974,081.  Specification of Letters Patent.  Patented Oct. 25, 1910.

Application filed October 1, 1909. Serial No. 520,570.

*To all whom it may concern:*

Be it known that I, RUDOLF KRONENBERG, a subject of the King of Prussia, German Emperor, residing at Ohligs, in the Province of the Rhine, Kingdom of Prussia, German Empire, have invented certain new and useful Improvements in Autocar-Wheels, of which the following is a specification.

The invention relates to autocar wheels with removable rim, and has for its object to provide a device which permits of the removal and the replacement of the rim in the easiest manner, and in which without special care in the handling, the rim, when replaced, will always receive an exactly centered position. Moreover any unintentional releasing of the rim wheels in use is completely prevented, and in spite of its easy detachment, a connection between the spokes and the rim is provided, which without requiring special fastening devices and without perforating the rim, is completely reliable.

The automobile wheel of my invention as above set forth is illustrated in the accompanying drawing as follows:

Figure 1 shows a vertical section through the wheel shown in side elevation in Fig. 2. Fig. 2 shows the corresponding elevation. Fig. 3 shows a section through the end of a spoke with clamping device and rim of the actual size and partially in elevation. Fig. 4 shows an elevation of the end of the spoke and the rim at right angles to Fig. 3. In both Fig. 3 and Fig. 4 the position is assumed to be that when the rim is fixed in place. Fig. 5 shows a view from above of the supporting body placed in the hollow spoke. Fig. 6 is an elevation similar to Fig. 3 in the position in which the removal of the rim can be effected. Fig. 7 shows a perspective elevation of the supporting body.

The wheel spokes are indicated by 1 and the wheel rim by 2. In each hollow spoke is placed a supporting body 3 which is rigidly connected with the spoke by means of a cross pin or the like. The outer surfaces of the supporting body 3 has two inclined surfaces 5, 5 and four flat surfaces 6, 6 and 7, 7 placed at right angles to the axis of the spoke. In the ends of each hollow spoke is a loosely inserted bolt 8 which is provided with correspondingly sloping flat surfaces also placed at right angles to the spoke, so that in the position shown in Fig. 6 when the rim is detached, the part 3 and the bolt 8 engage in one another and appear to form a closed body. The sloping surfaces of the bolt 8 are shown at 9, 9 the flat surfaces at 10, 10 and 11, 11. If the bolt 8 be turned out of the position shown in Fig. 6 by a quarter turn or rather more, then the sloping surfaces 5, 5 and 9, 9 slip over one another and the bolt 8 is pushed out of the hollow space, until the flat surfaces 6, 6 and 10, 10 rest upon one another. The bolt is then pushed forward exactly by the amount of the distance between the flat surfaces 6 and 7 and 10 and 11. In order to limit the turning of the inwardly directed hub of the bolt, the surfaces 12, 12, which are placed parallel to the axis of the spoke, are provided on the part 3, and the surfaces 14, 14 on the bolt 8. In order to limit the turning when the hub of the bolt is outwardly directed, there is cut into the hollow spoke a slot 15 in which the screw 13 fixed in the bolt 8 can slide.

When the bolt 8 is in the operative that is the extended position then the flat surfaces of the bolt 8 which are directed at right angles to the axis of the spoke, rest upon like surfaces of the part 3. The pressure and strains which would otherwise be transmitted to the spoke axle during the working are thus completely taken up by the aforesaid flat surfaces, so that there is no tendency to force down the bolt 8 into the spokes in order to turn the bolt by reason of strains operating in the direction of the spoke axis. As, however, the shocks produced in operation may have a tendency to cause a turning of the bolt 8, the end of the spoke is provided with a longitudinal slot 16, so that it acts as a spring, and around the end of the spoke the clamping ring 17 is placed which can be drawn together by means of the screw 18. When this has been done, then the bolt 8 cannot turn even when subject to shocks and therefore can never take a position which enables it to move inward. The outer end of the bolt 8 is cylindrical and is quite flat on top.

The bottom 19 of the rim is reinforced so that it can be provided with depressions 20 of circular section without injury to its power of resistance. Into these depressions 20 there engage the ends of the corresponding bolts 8, without causing the rim to be perforated or necessitating any special means for attachment between the rim and the bolts.

As will be obvious from this description, the operating of the device notwithstanding or in consequence of the uncommonly simple construction, is an extremely easy one; above all moreover, the rim is invariably centered and without necessitating special attention to this point in the fixing. If the rim is to be removed it is only necessary after releasing the screws 18 to turn back the bolts 8 a little, releasing the old rim, then to insert the new rim and to turn the bolts 8 back again into their working position, whereupon after tightening the screws 18 the rim is fixed in its place immovably and reliably centered.

To facilitate the turning of the bolts, these latter are provided with flat side surfaces 21, over which a suitably shaped key can engage. The flat surfaces moreover show at a glance whether all the bolts are in the extended position when the rim is in place.

What I claim is:

1. An autocar wheel comprising in combination a removable rim, slotted hollow spokes 1, a supporting body 3 in the interior of each hollow spoke having inclined surfaces and flat surfaces, bolts 8 adapted to coöperate with said supporting bodies provided with corresponding inclined surfaces and flat surfaces and clamping rings 17 placed around the ends of the said spokes, substantially as set forth.

2. Improved autocar wheel comprising in combination a removable rim, the hollow spokes 1 having inclined slots 15, a supporting body 3 in the interior of each hollow spoke, a series of bolts 8 each bolt resting against one of the said supporting bodies, both parts having coöperating inclined surfaces and flat surfaces respectively, screws 13 fixed in the said bolts 8 and adapted to slide in the said inclined slots 15, substantially as set forth.

In testimony, whereof I have signed my name to this specification in the presence of two subscribing witnesses.

RUDOLF KRONENBERG.

Witnesses:
H. E. MERSHOFF,
LOUIS VANDORN.